(12) United States Patent
Clarke et al.

(10) Patent No.: US 8,112,704 B2
(45) Date of Patent: Feb. 7, 2012

(54) METHOD FOR LOADING LARGE XML DOCUMENTS ON DEMAND

(75) Inventors: William D. Clarke, Florence, MA (US); Tao Zhan, Belchertown, MA (US)

(73) Assignee: Pitney Bowes Inc., Stamford, CT (US)

( * ) Notice: Subject to any disclaimer, the term of this patent is extended or adjusted under 35 U.S.C. 154(b) by 1174 days.

(21) Appl. No.: 11/789,385

(22) Filed: Apr. 23, 2007

(65) Prior Publication Data

US 2007/0198919 A1    Aug. 23, 2007

Related U.S. Application Data

(63) Continuation of application No. 10/249,969, filed on May 22, 2003, now Pat. No. 7,210,097.

(60) Provisional application No. 60/382,477, filed on May 22, 2002.

(51) Int. Cl.
*G06F 17/00* (2006.01)

(52) U.S. Cl. ........................ 715/234; 715/200

(58) Field of Classification Search .................. 715/200, 715/205, 234
See application file for complete search history.

(56) References Cited

U.S. PATENT DOCUMENTS

2002/0087596 A1*   7/2002   Lewontin ...................... 707/513

OTHER PUBLICATIONS

Cimprich, Inside Sblotron: Virtual XML Documents, xml..com**, Mar. 13, 2002, pp. 1-2.*
Wes Biggs et al., Simplify Programming with JDOM, May 1, 2001, IBM, pp. 1-11.*
Jason Hunter et al., Easy Java/XML integration with JDOM, part 1, May 18, 2000, pp. 1-12.*
Jason Hunter et al., Easy Java/XML integration with JDOM, part 2, Jul. 28, 2000, pp. 1-14.*

* cited by examiner

*Primary Examiner* — Stephen Hong
*Assistant Examiner* — Manglesh Patel
(74) *Attorney, Agent, or Firm* — George M. Macdonald; Charles R. Malandra, Jr.; Steven J. Shapiro

(57) ABSTRACT

Systems and methods for loading XML documents on demand are described. The system provides a Wrapper class for the XML Document class and the Element class. A user application then utilizes the Wrapper class in the same way that the Element class and Document class would be used to access any element in the XML Document. The Wrapper class loads external components as required. The external component retrieval is completely transparent to the user application and the user application is able to access the entire XML document as if it were completely loaded into a DOM object in memory. Accordingly, each element is accessible in a random manner. In one configuration, the XML document components or external components are stored in a database in a BLOB field as a Digital Document. The system uses external components to efficiently use resources as compared to systems using Xlink and external entities.

19 Claims, 7 Drawing Sheets

The parent XML Document:                              300
<XML version="1.0" encoding="ISO-8859-1"?>
<Workout: Statement>
    <WorkOut:Index>
        <AccountNumber>00183959</AccountNumber>
        <Name></Name>
        <Reference>0480329-20010305</Reference>
        <StatementDate format="yyyy/MM/dd">2001/03/05</StatementDate>
        <DueDate format="yyyy/MM/dd">2001/03/28</DueDate>
        <Company>NUA IUNMANT</Company>
        <Address1>586 HSOHSBIM FAUNV</Address1>
        <Address2></Address2>
        <City>IHIH ONHYM</City>
        <Region>AN</Region>
        <Postal>60137</Postal>
        <PreviousPayment format="#,###.##">250</PreviousPayment>
        <PreviousBalance format="#,###.##">229.15</PreviousBalance>
        <AmountDue format="#,###.##">-21.85</AmountDue>
    </WorkOut:Index>
    <StatementDetails>
        <CustID>00183959</CustID>
        <CustPhone>(555) 555-5555</CustPhone>
        <Statement>04803296</Statement>
        <StmtDate>2000/11/05</StmtDate>
        <DueDate>2001/03/28</DueDate>
        <PaymentDte>1000/01/01</PaymentDte>
        <AnnivDate>1993/11/30</AnnivDate>
        <EffectDate>1000/01/01</EffectDate>
        <DSLChg>0.00</DSLChg>
    </StatementDetails>
        <LongDistanceBeginRange>
            <CUSTID>00183959</CUSTID>
            <FromPhone></FromPhone>
            <LongDistanceCDRGroup xml:link="D3ExportXml" DocumentKey="2"/>
            <LongDistanceCDRSubTotal>
            </LongDistanceCDRSubTotal>
        </LongDistanceBeginRange>
</WorkOut:Statement>

The Child XML Document:
```xml
<?xml version="1.0" encoding="ISO-8859-1\"?>
<WorkOut:export>
    <LongDistanceCDRGroup WorkOut:export="XLink">
        <LongDistanceCDR>
            <CustID>00183959</CustID>
            <FromPhone>(555) 555-5555</FromPhone>
            <CallType>Residential Dial-1 Calls</CallType>
        </LongDistanceCDR>
        <LongDistanceCDR>
            <CustID>00183960</CustID>
            <FromPhone>(555) 555-5555</FromPhone>
            <CallType>Residential Dial-1 Calls</CallType>
        </LongDistanceCDR>
        <LongDistanceCDR>
            <CustID>00183961</CustID>
            <FromPhone>(555) 555-5555</FromPhone>
            <CallType>Residential Dial-1 Calls</CallType>
        </LongDistanceCDR>
    </LongDistanceCDRGroup>
</WorkOut:export>
```

FIG. 3B com.docsense.app.data.XmlDigitalElement  450

+setElement(e:Element):void
+getElement():Element
+setOwnerDocument(owner:XmlDigitalDocument):void
+getOwnerDocument():XmlDigitalDocument
+getTagName():String
+getAttribute(name:String):String
+getAttributes():NamedNodeMap
+setAttribute(name:String, value:String):void
+removeAttribute(name:String):void
+getAttributeNode(name:String):Attr
+setAttributeNode(newAttr:Attr):Attr
+removeAttributeNode(oldAttr:Attr):Attr
+getElementByTagName(name:String):XmlDigitalElement
+getElementsByTagName(name:String):XmlDigitalElementList
+hasAttribute(name:String):boolean
+appendChild(newChild:XmlDigitalElement):XmlDigitalElement
+cloneXmlDigitalElement(deep:boolean):XmlDigitalElement
+getChildElements():XmlDigitalElementList
+getElementValue():String
+setElementValue(nodeValue:String):void
+hasAttributes():boolean
+hasChildElements():boolean
+removeChildElement(child:XmlDigitalElement):XmlDigitalElement
+resolveExportLink(child:Element):XmlDigitalDocument element:Element
ownerDocument:XmlDigitalDocument
messageResource:MessageResource 452
com.docsense.app.data.DigitalDocument

FIG. 4B

METHOD FOR LOADING LARGE XML DOCUMENTS ON DEMAND

CROSS REFERENCE TO RELATED APPLICATIONS

This application is a Continuation of commonly owned, patent application Ser. No. 10/249,969 filed May 22, 2003, now U.S. Pat. No. 7,210,097 entitled Method for Loading Large XML Documents on Demand by Clarke et al. and claims priority under 35 U.S.C. section 119(e) from Provisional Patent Application Ser. No. 60/382,477, filed May 22, 2002, entitled Method For Loading Large XML Documents on Demand by Clarke, et al., both of which applications are incorporated herein by reference in their entirety.

A portion of the disclosure of this patent document contains material which is subject to copyright protection. The copyright owner has no objection to the facsimile reproduction by any one of the patent document or the patent disclosure, as it appears in the Patent and Trademark Office patent files or records, but otherwise reserves all copyright rights whatsoever.

BACKGROUND

The illustrative embodiments described in the present application are useful in systems for providing language neutral data exchange and more particularly are useful in systems including those for customizable electronic bill presentment and payment (EBPP) systems.

Several markup languages are known for the representation of information. For example, the Standard Generalized Markup Language (SGML) is a general-purpose markup language and has been standardized by the International Standards Organization. The Extensible Markup Language (XML) is another markup language derived from SGML (ISO 8879). The World Wide Web Consortium has published reports, standards and recommendations in these and other areas.

XML is a metalanguage that is a subset of SGML and that can be used to define the syntax of documents containing structured data. XML provides a language neutral data exchange format with nested tags that can be used to represent complex data structures in a text file. XML documents obey syntax rules. XML is extensible and can be used to create its own markup languages. Hyper-Text Markup Language (HTML) is a non-extensible markup language used with the World Wide Web (WWW) that includes syntax and presentation information. HTML uses loose structures that makes it difficult to process HTML documents effectively. However, XML documents are well structured. Each XML document has a root element and all elements must be nested within other elements.

XML and HTML are both markup languages, where tags are used to annotate data. In HTML, the syntax and semantics of the document are defined. HTML alone can be used to create a visible presentation to the user. XML allows you to define document syntax.

XML documents include elements that provide the logical structure of the document and entities that provide the physical structure of the document. The document will include markup tags having delimiters to separate the markup from the character text. XML text sometimes refers to character data and the markup information, not the character text alone. XML documents are characterized as a valid document or a well-formed document. A Document Type Definition (DTD) or XML Schema is used to define a valid XML document. The XML syntax allows the definitions of elements that have attributes and links. The DTD defines structural constraints and defines element types, attributes, entities and notations. The DTD defines the order as well as the occurrence of elements.

While HTML has presentation information embedded, XML uses Stylesheets such as extensible Stylesheet Language files (XSL) to define the presentation of the data. For example, one XML may have structured data that can be presented differently depending on the stylesheet used. XSL transformations may be performed using XSL Transformations (XSLT). Accordingly, AML can be transformed into other formats such as a different XML or HTML. While HTML supports hyperlinking, XML uses an Xlink standard that provides notation for how XML links may be implemented.

A well-formed XML document does not have to adhere to a DTD. However, a well-formed XML document must have one root element that contains all other elements. Additionally, each element must have an open tag and a close tag. XML is used to define syntax only. It is used to define content. XSL is used to define the semantics, style, or presentation of a document.

Many organizations are using Electronic Bill Presentment and Payment (EBPP) and Electronic Statement Presentment applications. To implement such applications, traditional paper documents may be converted to electronic form to be processed electronically and exchanged over the Internet, or otherwise, with customers, suppliers, or others. The paper documents will typically be re-formatted to be presented electronically using Hypertext Markup Language (HTML) Web pages, e-mail messages, Extensible Markup Language (XML) messages, or other electronic formats suitable for electronic exchange, processing, display and/or printing.

XML manipulator programs and parsers have been developed. There are two parsing systems in wide use. First, a Document Object Model (DOM) XML parser API is available. DOM is a tree based API that is used to build an in-memory tree representation of the XML document. As the entire XML document is loaded in memory as a document, object, XML manipulating programs that use this API may be useful for reordering, adding or deleting elements or attributes of the XML file. There is a second parsing API named the Simple API for XML (SAX). The SAX API is an event based API that uses callbacks to the manipulating program to report parsing events to the application, much in the way that a GUI interface reports events. The SAX API is useful for searching as it traverses the document without loading it into a memory object. The DOM parser requires more memory, but provides random access to the in-memory XML document object. It is more useful when using attributes rather than pure text element. The SAX parser uses fewer memory resources, but does not provide random access. The SAX parser may be useful in processing streams of data.

The traditional DOM parser will construct the whole document in the memory no matter whether the user application needs to access it. However, such DOM memory objects may not be possible for XML files that can be as large as 1 Gigabyte or larger.

The traditional SAX parser traverses the document only once and does not keep the document in memory. The traditional XLink technology for XML is designed to link external resources and show how they are related, but it does not solve the memory issue for large XML documents and it does not maintain the parent-child relationship between the entities.

As discussed, XML has become a universal format for using structured documents and data on the World Wide Web. It has been used widely in business software and enterprise applications. When an XML document is extremely large, it is impossible to hold the entire document in memory in a DOM object. While the SAX parser API could be used to parse the document, the application would not have random access to the document. It is inefficient to load an entire XML document in memory when certain portions of the document are infrequently accessed.

The D3, Digital Document Delivery system, version 2.0, is an enterprise solution for presenting bills, statements and invoices on the Internet. D3, version 2.0 is available from Pitney Bowes, Inc. of Stamford, Conn. In D3 version 2.0, an XML document could be broken down into small components that were stored in an archive file. A file-offset location would be used to locate the child components in the parent XML document.

SUMMARY

The present application describes illustrative embodiments for loading XML document on demand. The system provides a Wrapper class for the XML Document class and the Element class. A user application then utilizes the Wrapper class in the same way that the Element class and Document class would be used to access any element in the XML Document. The Wrapper class loads external components as required. The external component retrieval is completely transparent to the user application and the user application is able to access the entire XML document as if it were completely loaded into a DOM object in memory. Accordingly, each element is accessible in a random manner. In an illustrative embodiment, the XML document components or external components are stored in a database in a BLOB field as a Digital Document.

BRIEF DESCRIPTION OF THE DRAWINGS

FIG. 3A is an illustrative parent XML document according to an illustrative embodiment of the present application.

FIG. 3B is an illustrative child component according to an illustrative embodiment of the present application.

FIGS. 4A and 4B is a wrapper class diagram showing an illustrative XML Document wrapper class and an illustrative XML Element wrapper class, respectively, according to an illustrative embodiment of the present application.

DETAILED DESCRIPTION OF EMBODIMENTS

Figure 1:
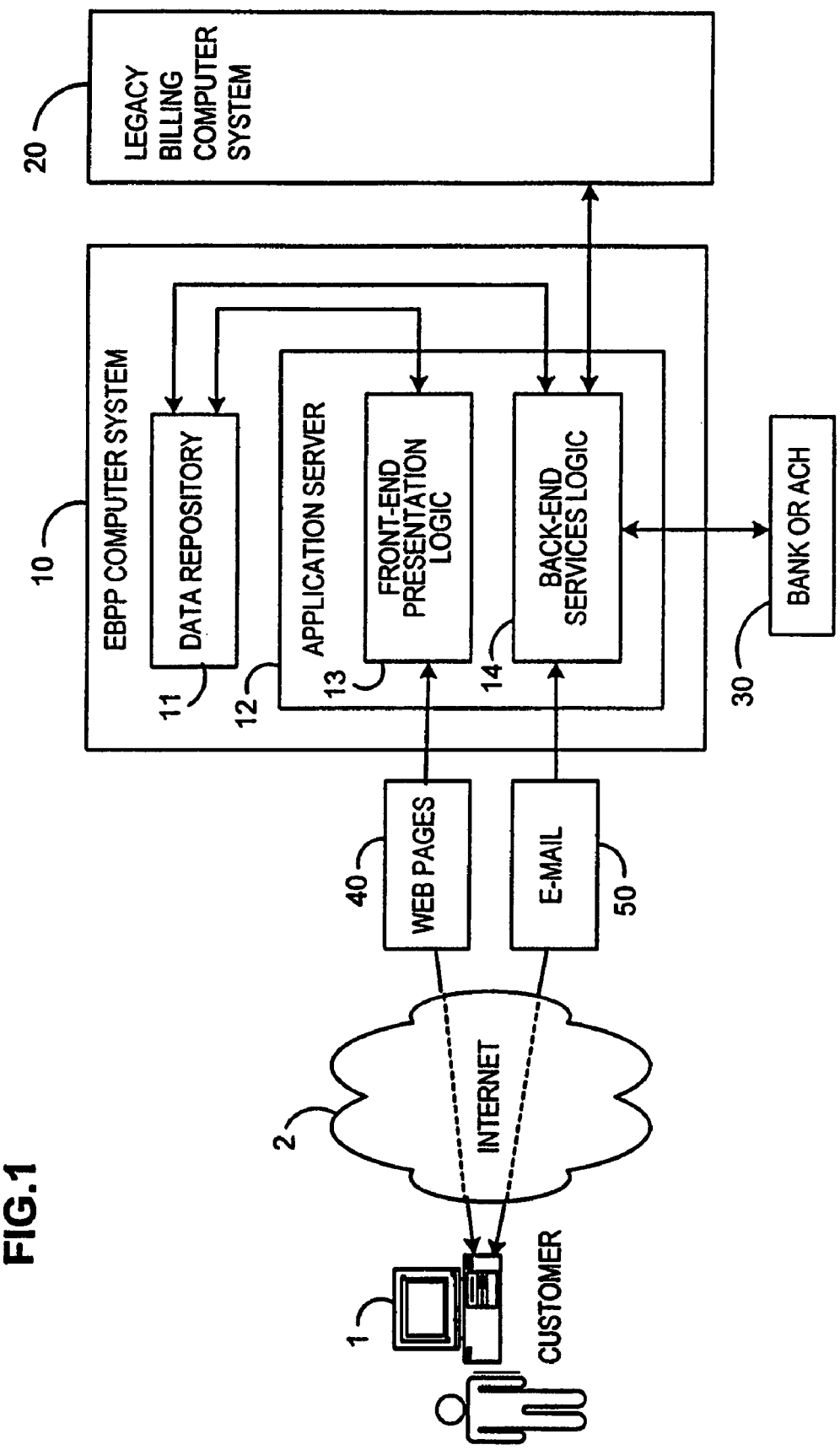
FIG. 1 is a schematic representation of an illustrative Electronic Bill Presentment and Payment system according to an illustrative embodiment of the present application.

Illustrative embodiments of a system and method for loading XML documents on demand are described. The illustrative embodiments are described with reference to an Electronic Bill Presentment and Payment (EBPP) solution. However, the embodiments may be applied to other systems as well. All code and descriptions in the specification and figures are copyright and all rights are reserved as specified above.

The embodiments are described with reference to certain commercially available components. The components may be customized as described and as applied in the context of the particular embodiment. Several alternative components are described in several embodiments. It is understood that the alternative components may be substituted into any of the embodiments as the context of the embodiment allows. Furthermore, the embodiments are understood to encompass the alternative of custom components having the capabilities described herein.

Customizable electronic bill presentment and payment systems and methods are described in U.S. patent application Ser. No. 10/153,105, filed May 22, 2002 by Clarke, et al., the application being commonly assigned and incorporated herein by reference.

Customizable software agents in an electronic bill presentment and payment systems and methods are described in U.S. patent application Ser. No. 10/184,159, filed Jun. 28, 2002, the application being commonly assigned and incorporated herein by reference.

Customized event messaging in an electronic bill presentment and payment systems and methods are described in U.S. patent application Ser. No. 10/260,385, filed Sep. 30, 2002, the application being commonly assigned and incorporated herein by reference.

Customizable software agents in an electronic bill presentment and payment systems and methods are described in U.S. patent application Ser. No. 10/184,159, filed Jun. 28, 2002, the application being commonly assigned and incorporated herein by reference.

Data source independent interface for an electronic bill presentment and payment systems and methods are described in U.S. patent application Ser. No. 10/260,593, filed Sep. 30, 2002, the application being commonly assigned and incorporated herein by reference.

The illustrative embodiments of the present application described herein improve traditional XML manipulation and parsing systems. The user application is able to randomly access and/or modify each element in a very large XML document while preserving resources. The system provides advantages of the memory model of DOM parses with the resource efficiency of the SAX based implementations.

The system loads required components into memory only when the user requires access to the components and also cleans up the non-used components to maintain memory efficiency. The memory loading and purging is transparent to the end user and middleware author as the calls can use the wrapper class as if the entire document was loaded into a DOM object in memory. In illustrative embodiment, the external components are stored in a relational database in order to take advantage of the features of DBMS and to make it easy to retrieve, update, and archive the XML documents.

The D3 version 2.0 system used XML component documents that could only be stored in an archive file such that the handling of the pointer in the archive file was difficult and error prone. The system did not provide a wrapper class access as if the XML document was loaded into a DOM document object. In the illustrative embodiments described herein, an XML document has components and a Digital Document is used to represent the XML document. Portions of the Digital Document may be stored in a live relational database in an online mode. Portions of the digital document may be stored in an archival file in an offline mode. The document components may be transferred from the offline archive location to the online database location and vice versa in a way that is transparent to the user of the Digital Document. Hierarchal relationships among the XML components are maintained in a Digital Document table that uses a primary key to identify each component. Accordingly, the end user may store XML components in an archive to save space in the database file if the components are not accessed frequently.

The D3 version 2.0 system used XML components with a special class to load components directly from an archive file such that a document could be expanded only with memory being increased. The D3 version 2.0 system does not provide for cleaning up unused components to release memory space. In the illustrative embodiments described herein, a Wrapper class for the standard XML Document class and a wrapper class for the standard XML Element class are provided. Accordingly, the user has access to the classes and the document as if the user were accessing a DOM document object that was entirely in memory. The system of the illustrative embodiments resolves all children component link loading and unloading and the user is presented with a single document object. Since the hierarchal structures of the XML documents are built using the two wrapper classes, it is possible to add and remove document components from memory when necessary.

The D3 version 2.0 system used XML documents that were read only. The documents could not be updated. In the illustrative embodiments herein, the XML document can be changed and updated using the Digital Document and the two wrapper classes. The user would be able to use the standard update API for the XML Document and Element classes. The changes for each of the XML components are then submitted into the backend XML document database and can then later be moved into an archive file.

FIG. 1 is a schematic representation of an EBPP system. EBPP computer system 10 controls the presentment of billing service web pages 40 for one or more billers over the Internet 2 to customer 1. Billing information is gathered by EBPP computer system 10 from the biller's legacy computer systems 20. Typically, billing data will be parsed by EBPP system 10 from a print stream generated by the legacy system 20, the legacy print stream being originally intended for printing conventional hard-copy bills.

A preferred method for parsing billing data from the legacy print stream is described in co-pending patent application Ser. No. 09/502,314, titled Data Parsing System for Use in Electronic Commerce, filed Feb. 11, 2000, which is hereby incorporated by reference into this application.

In addition to communication via web pages 40 generated during a session, EBPP computer system 10 includes the capability of sending and receiving e-mail messages 50 to and from the user 1. Typically, system 10 will generate a message to user 1 upon the occurrence of a predetermined event. An example of such an event is a new billing statement becoming available, or the approach of a due date for an unpaid bill. EBPP system 10 is also capable of communicating with a bank or ACH network 30 to process bill payment activities.

System 10 includes a data repository 11 in which billing data for use with system 10 may be stored in a variety of formats. Data in the repository can be organized in a database, such as the kind available from Oracle or DB2. The Statement data may also be stored in an XML format. XML is a format that allows users to define data tags for the information being stored.

Standard communications and computing hardware and other platforms are utilized. They include appropriate security, redundancy and load balancing, all of which are known.

The EBPP computer system 10 itself is typically comprised of standard computer hardware capable of processing and storing high volumes of data, preferably utilizing a J2EE platform. EBPP system 10 is also capable Internet and network communications. The system may include front-end presentation logic 13 and the back end servicing logic 14. Typically, front-end logic 13 is comprised of Java Server Pages (JSP's) that control the presentation of billing information in the form of web pages. Within the JSP's, front-end logic 13 can also utilize Enterprise Java Beans (EJB's) that comprise objects for performing specific tasks.

The back-end services logic 14 comprises the software for functions that typically do not need to be customized for particular billers. Preferably, very little of the back-end services must be customized for a particular biller's needs.

Naming conventions and namespaces can be a source of concern for XML documents as there is no central distributor of names and name spaces in order to avoid the homonym problem of two entities using the same name for different purposes.

Figure 2:
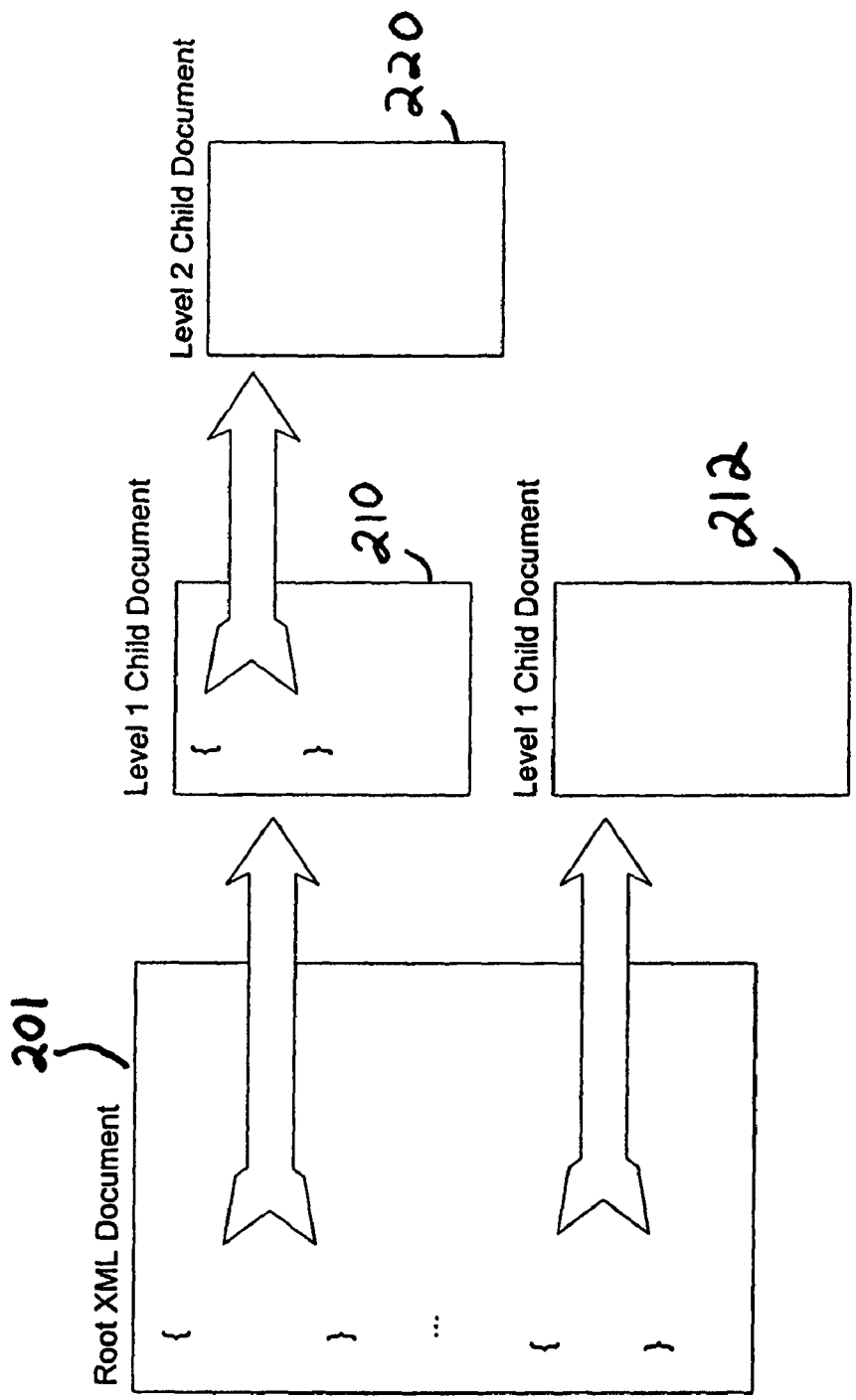
FIG. 2 is a schematic representation of an illustrative Digital Document according to an illustrative embodiment of the present application.

Referring to FIG. 2, an illustrative embodiment of a Large Digital Document formed from an XML document is described. A Root XML Document 201 has level 1 child documents defined 210, 212 and a level 2 child document is also defined 220.

In the illustrative embodiments described herein, an XML document is divided into a root document with components. Each component has a unique key that is used to identify it. When a portion of an XML document is chosen to form an external component, an external link attribute contains the unique key of the child component and is placed in the Tag of the original XML document. This process can be repeated recursively and a hierarchal structure of the components is formed. The Digital Documents formed in this way can be stored either in a database as a BLOB field or stored in an archive file. An archive file could be compressed. The compressed files may use Zip, Jar or other formats. When a document is in the database, the document or portion of a document is said to be online. When a document or portion of a document is in an archive file, it is said to be offline. The system loads Digital Documents from an archive into a database when necessary.

A wrapper class is constructed for both the XML document class and the XML Element class of a normal XML service program such as xml4j. The wrapper classes have the same interface as the traditional XML Document and Element classes. The wrapper classes, however, can resolve the external link tag in the XML document and automatically load the child XML Document Component when the element is accessed. Once a child component is loaded into memory, it can be accessed by the user as if it were part of a traditional XML document. The relationship between the parent and children is kept in the wrapper class. The document tree is automatically expanded according to the user request. Another process may then examine the whole document tree and destroy those components that are seldom accessed by the user in order to free memory space. The components are still linked by the parent document and can be loaded again when the user accesses the element in the component.

Referring to FIGS. 3A and 3B, an illustrative parent XML document 300 is shown in FIG. 3A with an illustrative child component 350 shown in FIG. 3B.

In the LongDistanceCDRGroup tag, the data is moved out to the child XML document. In its place, an xml:link attribute is placed in the tag and DocumentKey identifies the unique key for the child XML Document. The child XML Document contains the data that was moved out of the original XML document. The new parent XML document uses the link to identify the child. The WorkOut:Export attribute is used to identify it as a child link document.

The document key is required in the parent document. The document key is the primary key in the database table. The database query on the primary key DocumentKey=2 would retrieve the child document with that unique key. The links are one way from the root down the tree. Xlink actually points to an external resource such as a file or into an archive with an offset. The illustrative embodiment uses an alternative link system that embeds into the tag a database primary key that is unique for the installation. Each installation has a database and each database will not reuse the unique keys. Here we have defined external components that differ from the external entities of the XML specification.

Certain systems have used standard Xlink links and external entities to break up large XML files. The DOM model would not load the external entities in a memory resident DOM object in those cases. However, that does not solve the problem of random access of a large document as a memory resident DOM model.

Here, the illustrative embodiment uses dynamic loading of "components" is used to create a virtual DOM model such that the wrapper classes are used to provide access to the entire XML DOM object as if it were all in memory.

The traditional External Entity is used to break down a large XML document to make them editable, searchable, and downloadable for a human being. A small piece of XML document is easy to store, edit and transfer. However, in terms of machine usage or software usage, it is the same as the single large XML document. When a normal DOM parser tries to parse the XML document with the External Entities, it will replace the external entities with the XML file it refers to and include that part inside the whole DOM tree in memory. Some implementations do not even load the external entities into the tree. Once loaded into memory, the External Entities disappear and there is no parent-children relationship maintained in the traditional DOM tree. The result is that traditional DOM systems still try to construct a very large DOM tree in memory. The embodiments of the present application solve that problem.

Instead of trying to resolve all the External Entity during parsing time, the embodiments of the present application delays the loading process until the real access by the client. The client is usually a software program that wants to get some data in a particular element of the child component. So the initial DOM tree object of the illustrative embodiment in memory is very small. Additionally, the system maintains the parent-children relationship. The system also automatically expands and shrinks the Document Object according to the usage.

Traditional Xlinks are used to describe a connection between two resources, for example, the source, the connection's starting resource, is itself the link element. The target or ending resource of the connection is identified by a URI. It is up to the client software how to interpret the link, e.g., how the connection is presented to the end user or what it makes software reading the document do. For example, the normal browser could just render the link in the web page as a blue link. When the user clicks the link, it loads the target resource. So the normal DOM parser will not try to resolve XLinks during the parsing, instead, it reserved the link as the normal XML element and let the client decide what to do.

The illustrative embodiments of the present application, addresses the need that the client software wants to randomly access any piece of data in a large XML document. The data extracted from the XML could be used to construct a JSP, HTML or other XML document and presented to the end user. Traditional XLinks cannot solve such a problem.

Figure 4A:
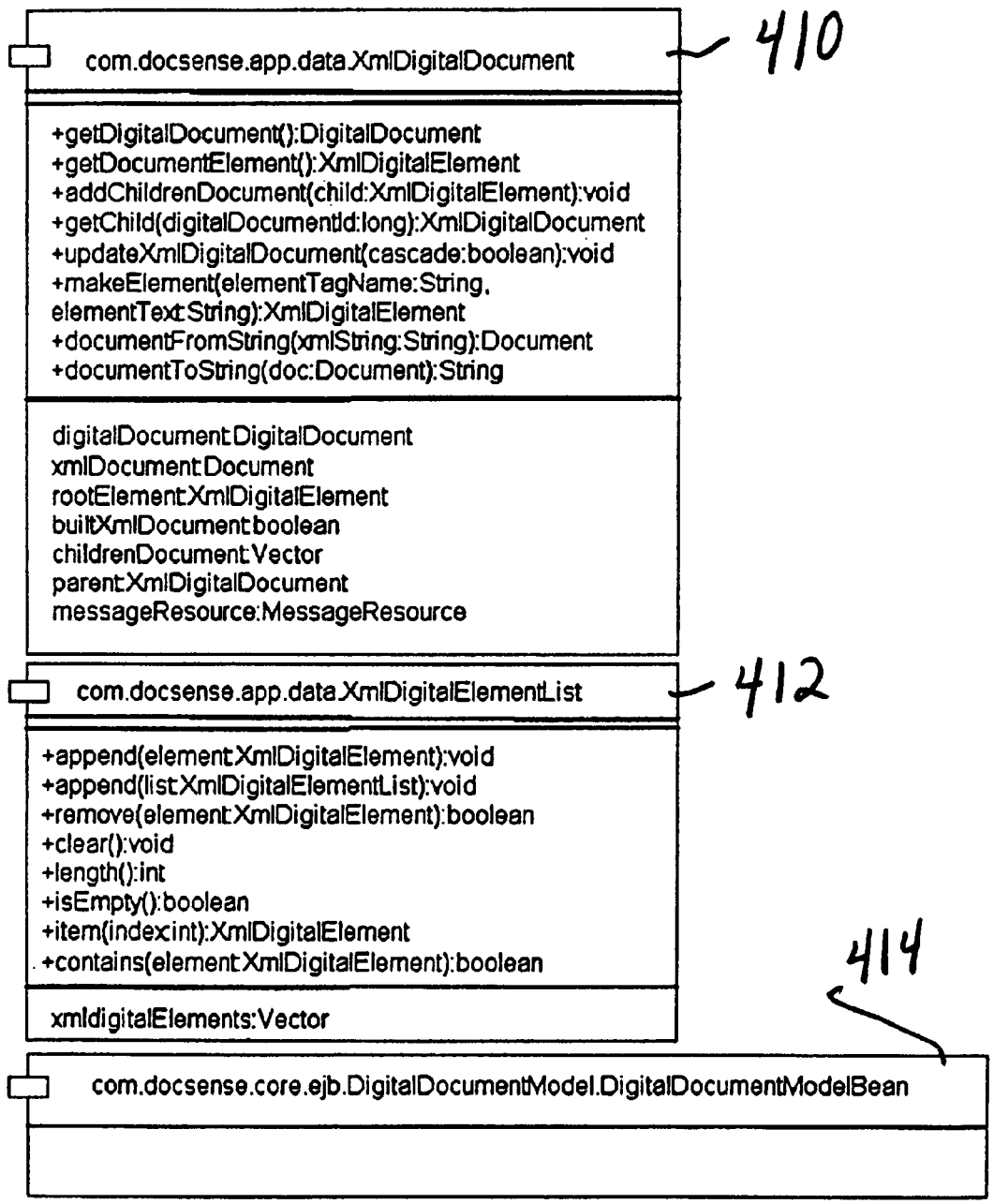

Referring to FIGS. 4A and 4B, the wrapper class diagram is shown for the XML Document wrapper 410, 412, 414 and the XML Element wrapper, 450, 452, respectively.

The Digital Document Object inside the XmlDigital Document Object contains the content bytes data for the XML Document. When a user first accesses the root XmlDigitalElement object, the contents of the element are unpacked (if necessary) and then built into an XML DOM object. The XmlDigitalDocument then works as a proxy object for the XML DOM object.

The XmlDigital Document contains a root XMLDigitalElement. After a user gets a root XmlDigitalElement, the user can then traverse the whole XML DOM tree. All the elements in the DOM tree are constructed as XmlDigitalElement objects and the XmlDigital Document is the owner document for those objects. The user need only deal with the XmlDigitalElement object to retrieve the attributes and values of the element.

XmlDigitalDocument has an updateXmlDigitalDocument( ) method that will convert the XML DOM tree back to an XML string and then update the XML into the database. Users can make any change on this DOM tree by following the XmlDigitalElement and XmlDigitalDocument API. For example, the use can modify attribute, add new attribute, modify value, add new element, and remove element.

XmlDigitalDocument also maintains a Vector for its children XmlDigitalDocuments. This vector provides a reference to all the children XmlDigitalDocuments. When updateXmlDigitalDocument( ) method is invoked, the user may specify whether the update operation is cascading. In other words, should all the nested children XmlDigitalElement objects to be updated.

XmlDigitalElement objects represent the Element objects for the XmlDigitalDocument object. It works as a proxy object for the org.w3c.dom.Element object. For example, it can be used to retrieve element attributes, element value, children elements, modify element attributes, element value, add new children element, remove existing children element, and clone element.

XmlDigitalElement contains a XmlDigitalDocument object, representing the owner XmlDigitalDocument Object.

In retrieving children elements methods, such as getElementByTagName( ), getElementsByTagName( ) and getChildElements( ), an element called D3Export XML element is handled specially. This element contains "xml:link" attribute and represents that all the children elements for this element (including itself) are exported to another DigitalDocument record. The DocumentKey attribute contains the DigitalDocumentId for this children record. The resolveExportLink( ) method is invoked in this case and retrieves the children DigitalDocument Object using DigitalDocumentModel EJB. If this child DigitalDocument object does not exist in the children list of the owner XmlDigitalDocument, a new XMlDigitalDocument Object is constructed as the children XmlDigitalDocument of the owner XmlDigitalDocument object.

Then the corresponding methods, e.g., getElementByTagName( ), getElementsByTagName( ) or getChildElements( ) of the root XmlDigitalElement of the children XmlDigitalDocument are invoked to continue to get the children XmlDigitalElements. The resolving Export link operation and creating children XmlDigitalDocument objects are totally transparent to the users. The users treat the parent and children XmlDigitalDocuments as a whole XML DOM tree object and can get access to any Element from the DOMUpdate. The DOMUpdate is also transparent by invoking the cascading update method for the owner XmlDigitalDocument object.

The getElementsByTagName( ) and getChildElements( ) methods of XmlDigitalElement class return a XmlDigitalElementList Object, which represent a list of XmlDigitalElement Objects and provide necessary API methods to traverse all the XmlDigitalElements.

The DigitalDocumentModel provides the functionality used to retrieve, update and insert DigitalDocument objects. DigitalDocument objects represent a digital document with large content data. For example, the digital document may be a statement detail, outbound email message content and/or inbound email message content. In the system, those large content data could be either stored into a BLOB field of the DigitalDocument table in the database or stored in an archive jar file. No matter where the content data is stored, there is always a DigitalDocument record associated with it, and the Status is either ONLINE or OFFLINE.

When DigitalDocumentModel retrieve the DigitalDocument object, if the status is OFFLINE, the content data is retrieved from the archive file and set to the Content field of the DigitalDocument object. The ONLINE and OFFLINE storage is totally transparent to the users. Inserting DigitalDocument forces the status to be online and the content is inserted into a database BLOB field. Updating DigitalDocument also forces the status to be online and new content is updated to the database BLOB field. A special nightly history processor will process the records in the DigitalDocument table and export content data to archive file if the status is ARCHIVEREQUEST.

DigitalDocumentModel also construct a PackedDigitalDocument when the content is compressed and return this object to the users. PackedDigitalDocument will automatically handle compressing and uncompressing action to the content so that compressing and uncompressing content data is also transparent to the users.

Figure 5:
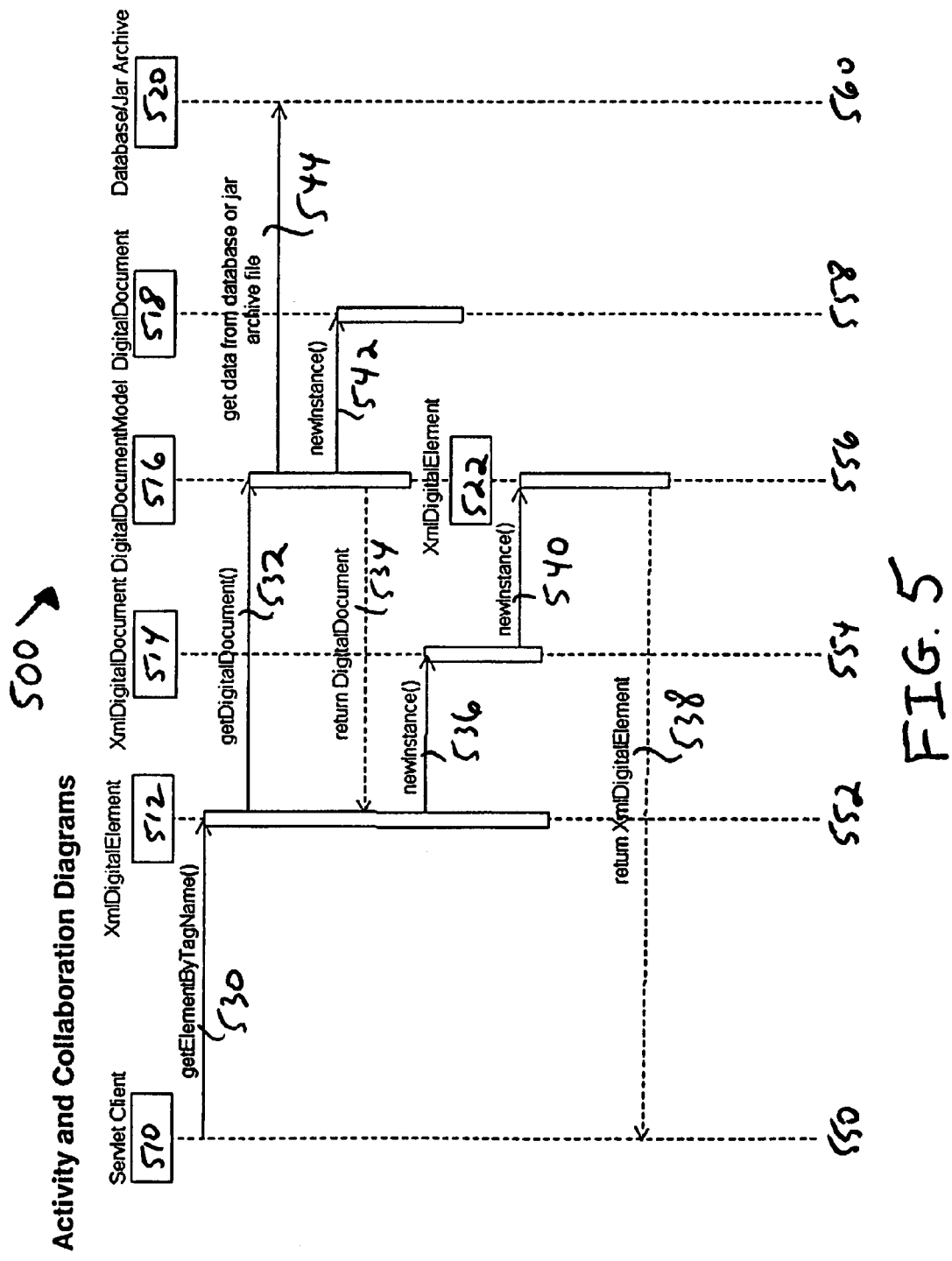
FIG. 5 is an illustrative activity and collaboration diagram for a system according to an illustrative embodiment of the present application.

Referring to FIG. 5, an illustrative embodiment using Java to implement Digital Documents is described. The Activity and Collaborative Diagrams 500 are shown. Time references 550, 552, 554, 556, 558, and 560 show the activity flow. Server client 510, XmlDigital Element 512, XmlDigitalDocument 514, DigitalDocumentModel 516, DigitalDocument 518, XmlDigitalElement 522 are objects. The DatabaseJar archive is an object or a database or an archive. The methods 530, 532, 534, 536, 538, 540, 542, 544 and 544 are shown.

The system shown in FIG. 5 includes activities that can be accomplished using Java code.

For example, an illustrative Java package named "package com.docsense.app.data" is stored in a file XmlDigitalDocument.java.

Several standard libraries can be imported including java.util.Vector; java.io.ByteArrayInputStream; java.io.StringWriter; org.w3c.dom. Document; org.w3c.dom.Node; org.w3c.dom.Element; org.apache.xerces.parsers.DOMParser; org.xml.sax.InputSource; org.apache.xml.serialize. OutputFormat; org.apache.xml.serialize.Serializer; org.apache.xml.serialize.SerializerFactory; org.apache.xml.serialize.XMLSerializer; org.apache.log4j.Category; org.apache.log4j.BasicConfigurator; and org.apache.log4j.helpers.NullEnumeration.

Additional custom libraries can be included as understood by one of skill in the art.

The following class code snippet is the XmlDigital Document class. The first protected statement is the log 4j category for this class. The new XmlDigitalDocument object is then created by using a digitalDocument as model. CAT is configured if necessary. The parameter dd DigitalDocument object contains xml content.

The new XmlDigitalDocument object is then created by using a digitalDocument as model. If the new flag is true, a new DOM tree object is created and the root Element is set. The User uses this constructor to create an empty XmlDigitalDocument. CAT is configured if necessary. The parameter dd DigitalDocument object contains xml content. The parameter newobject, a boolean flag, indicates whether to create an empty XmlDigitalDocument. The parameter rootTag is the tag name for the new created DOM tree root.

Then, a new XmlDigitalDocument object is created by using a digitalDocument as model and a parent XmlDigitalDocument. CAT is configured if necessary. The parameter p parent XmlDigitalDocument.

The protected DigitalDocument is an internal method to get DigitalDocument Object from this XmlDigitalDocument object.

The public XmlDigitalElement gets Root XmlDigitalElement for this XmlDigitalDocument. This is the only way to access Xml DOM tree data. If it is the first time to invoke the method, the xml DOM tree is built from the DigitalDocument content. Otherwise, rootElement is returned. Returns the root XmldigitalElement of the XmlDigitalDocument.

The protected AddChildrenDocument method adds a XmlDigitalDocument to the children list of current XmlDigitalDocument. The parameter child is the child XmlDigitalDocument.

The next method finds the child XmlDigitalDocument by particular DigitalDocumentId from the Children list. It can be used when resolving the export link: if the children XmlDigitalDocument objects already exist, there is no need to retrieve again from database. Parameter digitalDocumentId the primary key of the child XmlDigitalDocument to be found. It returns the XmlDigitalDocument Object for the child.

The next method converts the xml DOM tree object to xml String and set it to the content of the DigitalDocument. This method should be called before you pass this XmlDigitalDocument back to create new DigitalDocument. UpdateXmlDigitalDocument( ) method internally calls this method.

The public void updateXmlDigitalDocument(boolean cascade) method updates the content back to database. If cascade is set to true, it also invokes updateXmlDigitalDocument( ) method for all the children XmlDigitalDocument objects, which lead to a cascading update in a nested situation. The parameter cascade is a boolean flag for cascading update. The method converts the xml DOM tree object to xml String and updates the content back to database. If cascade is set to true, it also invoke updateXmlDigitalDocument( ) method for all the children XmlDigitalDocument objects, which lead to a cascading update in a nested situation.

The next method creates a new XmlDigitalElement for this XmlDigitalDocument. The current object becomes the owner Document of the new created XmlDigitalElement. Use this method to create new element in the xml DOM tree. The parameter elementTagName is the tag name of the new element; elementText is the text value of the new element. It can be null. The method returns the new created XmlDigitalElement.

The next module is a static utility method that parses the given XML string to create an XML DOM tree. You can use this method when you need to convert a stored XML string back into an XML DOM tree. The tree is provided as a Document object. The parameter xmlString is the XML-formatted string representing the XML tree. The module returns the Document object containing the XML DOM tree parsed from the string.

The next module is a static utility method that parses the given XML DOM tree to generate an XML string. You can use this method when you need to convert a XML DOM tree into an XML string. The tree is provided as a Document object. The parameter doc is the Document object representing the XML DOM tree. It returns the Xml-formatted string for the XML DOM tree.

Next, there is the Internal DigitalDocument object for this XmlDigitalDocument object and then the Internal XML DOM tree object. Next is the root XmlDigitalElement for this XmlDigitalDocument. Next is the Boolean flag used to indicate if the DOM tree is built.

Then the code lists The Children XmlDigitalDocument objects list. Next, the parent XmlDigitalDocument object is listed and then the class name. Finally the MessageResource for CAT message is listed and the class ends.

The Java code snippet follows with periods delimiting the end of line.

```
public class XmlDigitalDocument implements java.io.Serializable {.
    protected final static Category CAT =
Category.getInstance(XmlDigitalDocument.class);.
    public XmlDigitalDocument( DigitalDocument dd )  {  }  .
    public XmlDigitalDocument(DigitalDocument dd, boolean
        newObject, String
rootTag ){ }.
    public XmlDigitalDocument( DigitalDocument dd,
        XmlDigitalDocument p ) { }.
    protected DigitalDocument getDigitalDocument( ) { }.
    public XmlDigitalElement getDocumentElement( ) throws
XMLDataAccessException{ }.
    protected void addChildrenDocument(XmlDigitalDocument child)
    { }.
    protected XmlDigitalDocument getChild(long digitalDocumentId)
        throws
XMLDataAccessException { }.
    public void setDigitalDocument( ) throws XMLDataAccessException
    { }.
    public void updateXmlDigitalDocument(boolean cascade) throws
XMLDataAccessException   {   }.
    public XmlDigitalElement makeElement(String elementTagName,
        String
elementText) { }.
    public static org.w3c.dom.Document documentFromString( String
        xmlString )
throws XMLDataAccessException { }.
    public static String documentToString( Document doc ) throws
XMLDataAccessException { }.
        protected DigitalDocument digitalDocument = null;.
        protected transient Document xmlDocument = null;.
        protected transient XmlDigitalElement rootElement = null;.
        protected boolean builtXmlDocument = false;.
        protected transient Vector childrenDocument = new Vector( );.
        protected transient XmlDigitalDocument parent = null;.
        protected static final Class iam = XmlDigitalDocument.class;.
        MessageResource messageResource = null;.
    }.
```

For example, an illustrative Java class XmlDigitalElement is shown. Import files include org.apache.log4j.Category; org.apache.log4j.BasicConfigurator; org.apache.log4j.helpers.NullEnumeration; org.w3c.dom.NodeList; org.w3c.dom.Node; import org.w3c.dom.Element; org.w3c.dom.Attr; org.w3c.dom.DOMException; import org.w3c.dom.NamedNodeMap; com.docsense.core.exceptions.data.XMLDataAccessException; com.docsense.core.MessageResource; com.docsense.core.ejb.DigitalDocumentModel.DigitalDocumentModelHome; com.docsense.core.ejb.DigitalDocumentModel.DigitalDocumentModel; and com.docsense.core.mvc.HttpController.

XmlDigitalElement objects represent the Element objects for XmlDigitalDocument object. It works as a proxy object for org.w3c.dom.Element object and has the functionality to retrieve element attributes, element value, children elements, modify element attributes, element value, add new children element, remove existing children element, clone element, etc.

The log 4j category for this class is shown. It Creates a new XmlDigitalElement object contains internal Element object. CAT is configured if necessary. This method is protected and only for internal usage. To create a new XmlDigitalElement, use makeElement( ) method of XmlDigitalDocument. The parameter e the Element Object inside the XmlDigitalElement object.

It then Creates a new XmlDigitalElement object contains internal Element object. The owner XmlDigialDocument object is passed in and set to class variable.CAT is configured if necessary.

Then the Internal method to set the Element object is shown. Then the Internal method to get the Element object is shown. Users should never directly access this Element object. It returns the Element object.

Then the Internal method to set owner XmlDigitalDocument object is shown. The parameter owner is the owner XmlDigitalDocument object. Then the Internal method to get owner XmlDigitalDocument object is shown. It returns the owner XmlDigitalDocument object. Next, the Return Element tag name method is shown as well as the Return Element attribute value with specific name method and the Return all the attributes of the Element method that returns the NamedNodeMap object representing all the attributes nodes of the Element.

The next method Modifies the value of the named attribute. If it doesn't exist, a new attribute is created. Parameter name is the name of the attribute and parameter value the value of the attribute. Next the Remove named attribute is shown The next method listed returns an Attr object for named attribute. The parameter name is the name of the attribute and the method returns the attr object for this attribute. The next method listed adds a new attribute node. If an attribute with that name (nodeName) is already present in the element, it is replaced by the new one. The parameter newAttr is the new Attr object to add and the method returns the new added Attr object. The next method removes the specified attribute node. If the removed Attr has a default value it is immediately replaced. The parameter oldAttr is the Attr object to be removed. The method returns the removed Attr object. The next method listed returns an XmlDigitalElement object for a named children element. If the children element is an export link element, resolveExportLink( ) method is invoked to retrieve the children DigitalDocument Record and the named XmlDigitalElement in the children XmlDigitalDocument is returned. The parameter name is the name of the children Element and the method returns the XmlDigitalElement object for the named child.

The next method returns an XmlDigitalElementList object for all the named children elements. If the children element is an export link element, resolveExportLink( ) method is invoked to retrieve the children DigitalDocument Record and the named XmlDigitalElement in the children XmlDigitalDocument is append to the return XmlDigitalElementList. The parameter name is the name of the children Elements and the method returns the XmlDigitalElementList object for the named children.

The next method listed returns a boolean flag indicating if the element contains named attribute. The parameter name is the name of the attribute and the method returns true if the element contains named attribute, false otherwise. The next method listed Appends an XmlDigitalElement object into the children list of current XmlDigitalElement. The new child object should have the same owner XmlDigitalDocument object as the current object. Usually makeElement( ) method is invoked for owner XmlDigitalDocument object to create a new child for the current Element. The parameter newChild is the child XmlDigitalElement to be appended. The method returns the added new child XmlDigitalElement object.

The next method Clones a same XmlDigitalElement object as the current XmlDigitalElement object. The new cloned object has the same owner XmlDigitalDocument as the current object but has no parent Element. The parameter deep is a boolean flag indicating if the clone is a deep clone, e.g., clone all the children elements of the current element. The method returns the new cloned XmlDigitalElement object.

The next method listed returns an XmlDigitalElementList object for all the children elements. If the children element is an export link element, resolveExportLink( ) method is invoked to retrieve the children DigitalDocument Record and the children XmlDigitalElement in the children XmlDigitalDocument is append to the return XmlDigitalElementList. The method returns the XmlDigitalElementList object for all the children Elements.

The next method returns the string value for the Element. It returns the string value for the XmlDigitalElement. The next method listed Modifies the string value for the Element. The parameter nodeValue is the new value string for the XmlDigitalElement object. The next method listed returns a boolean flag indicating if the element has any attribute. It returns true if the XmlDigitalElement contains an attribute, false otherwise. The next method returns a boolean flag indicating if the element has any children element. It returns true if the XmlDigitalElement has a children element, false otherwise. The next method listed removes specific children element for current element. The parameter child the children element to be removed and it returns the removed children element.

The next method listed is an internal helper method used to resolve export link element. This method first gets export DigitalDocumentId from DocumentKey attribute of the element. If it doesn't exist in the children list of the current owner XmlDigitalDocument, it then retrieve the DigitalDocument object from database, construct a new XmlDigitalDocument object for the children record and return this object. If it exists in the children list of the current owner XmlDigitalDocument, it just returns the child object. The parameter child is the export link element and it returns the children XmlDigitalDocument.

The next line lists the class name iam that us XmlDigitalElement.class. The next lists the internal Element object. The next lists the owner XmlDigitalDocument object and the next lists the MessageResource for CAT message. The next three lines list the static variables for export link attributes.

The Java code snippet follows with periods delimiting the end of line.

```
public class XmlDigitalElement {.
    protected final static Category CAT =
Category.getInstance(XmlDigitalElement.class);.
    protected XmlDigitalElement(Element e)   {  }.
    protected XmlDigitalElement(Element e, XmlDigitalDocument owner)   {  }.
    protected void setElement(Element e)   {  }.
    protected Element getElement( )   {  }.
    public void setOwnerDocument(XmlDigitalDocument owner)   {  }.
    public XmlDigitalDocument getOwnerDocument( )   {  }.
    public String getTagName( )   {  }.
    public String getAttribute(String name)   {  }.
    public NamedNodeMap getAttributes( )   {  }.
    public void setAttribute(String name, String value) throws DOMException   {  }.
    public void removeAttribute(String name) throws DOMException   {  }.
    public Attr getAttributeNode(String name)   {  }.
    public Attr setAttributeNode(Attr newAttr) throws DOMException   {  }.
    public Attr removeAttributeNode(Attr oldAttr) throws DOMException   {  }.
    public XmlDigitalElement getElementByTagName(String name) throws
XMLDataAccessException   {  }.
    public XmlDigitalElementList getElementsByTagName(String name) throws
XMLDataAccessException   {  }.
    public boolean hasAttribute(String name)   {  }.
    public XmlDigitalElement appendChild(XmlDigitalElement newChild) throws
DOMException, XMLDataAccessException   {  }.
    public XmlDigitalElement cloneXmlDigitalElement(boolean deep)   {  }.
    public XmlDigitalElementList getChildElements( ) throws
XMLDataAccessException{ }.
    public String getElementValue( ) throws DOMException   {  }.
    public void setElementValue(String nodeValue)throws DOMException   {  }.
    public boolean hasAttributes( )   { }.
    public boolean hasChildElements( )   { }.
    public XmlDigitalElement removeChildElement(XmlDigitalElement child)   {  }.
    protected XmlDigitalDocument resolveExportLink(Element child) throws
XMLDataAccessException   {  }.
    protected static final Class iam = XmlDigitalElement.class;.
    protected Element element = null;.
    protected XmlDigitalDocument ownerDocument = null;.
    MessageResource messageResource = null;.
    private String D3LinkAttr        = "xml:link";.
    private String D3ExportLinkAttValue = "D3ExportXml";.
    private String DocumentKeyAttr   = "DocumentKey";.
}.
```

In another piece of Java code, the class XmlDigitalElementList objects represent a list of XmlDigitalElement objects. It provides a set of API to traverse the list. Typical usage would be as follows.

```
XmlDigitalElementList childrenElements = element.getChildElements( );.
for (int j=0;j<childrenElements.length( );j++)  {.
XmlDigitalElement child = childrenElements.item(j);.
Etc. }.
```

The public XmlDigitalElementList( ) creates a new XmlDigitalElementList object. The next method listed creates a new XmlDigitalElementList and sets the internal Vector to the passed Vector object. The parameter list is the Vector list object. The next method listed Adds a new XmlDigitalElement into the list. The parameter element is the XmlDigitalElement object to be added. The next method listed adds all the XmlDigitalElement from parameter object into the current list. The parameter list is the XmlDigitalElementList object that contains the XmlDigitalElement objects to add.

The next method listed removes a XmlDigitalElement from the list. The parameter element is the XmlDigitalElement object to be removed.

The public void clear( ) method resets the list to empty. The next method returns the size of the list. The next method determines whether the list is empty.

The next method returns the XmlDigitalElement object by index. The parameter index is the index for the returned XmlDigitalElement object. The method returns the XmlDigitalElement object of specific index.

The next method determines if the list contains the specific XmlDigitalElement object. The parameter element is the XmlDigitalElement object to look up and the method returns true if the XmlDigitalElement object exist in the list, false otherwise.

Finally, the he internal Vector object for the list is shown. The Java code snippet follows with periods delimiting the end of line.

```
public class XmlDigitalElementList {.
public XmlDigitalElementList( )   {   }.
public XmlDigitalElementList(Vector list)   {   }.
public void append(XmlDigitalElement element)   {   }.
public void append(XmlDigitalElementList list)   {   }.
public boolean remove(XmlDigitalElement element)   {   }.
public void clear( )   {   }.
public int length( )   {   }.
public boolean isEmpty( )   {   }.
public XmlDigitalElement item(int index)   {   }.
public boolean contains (XmlDigitalElement element)   {   }.
protected Vector xmldigitalElements = new Vector( );         .
}.
```

The system can accommodate XML files that use external entities as well as internal entities. The external components are used to efficiently allocate memory and provide for memory clean up such as garbage collection.

The present application describes illustrative embodiments of a system and method for processing Digital Documents. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed:

1. A method for creating a virtual memory model compatible digital document representation of an XML document comprising:
    receiving an XML document having external component attributes;
    obtaining a unique identifier for each external attribute; and
    producing a digital document having a root element and at least one child element having an attribute identifying a unique identifier to a child component as a one-way link,
    wherein the root element is a memory resident portion and the at least one external portion includes an external portion that is loaded into memory when used;
    producing at least one wrapper class in the digital document, and
    wherein at least one of the external attributes includes an external link tag that includes a database key.

2. A method for loading a virtual DOM model of an XML document into memory comprising:
    receiving a virtual DOM compatible digital document having a parent element and at least one child element including a child component attribute that is associated with an external portion of the XML document;
    loading the virtual DOM compatible digital document into memory;
    receiving a request for the child component;
    in response to the request for the child component, retrieving the child component and loading the child component into memory using the child component attribute to obtain the child component, wherein the parent element is a memory resident portion and the at least one external portion includes an external portion that is loaded into memory when used, wherein,
    the digital document includes at least one wrapper class, and
    the child component attribute includes an external link tag that includes a database key.

3. The method of claim 1 further comprising:
    storing the external portion in a database.

4. The method of claim 1 wherein:
    the database includes a relational database.

5. The method of claim 1 wherein:
    the attribute includes an external link tag that includes a database key.

6. The method of claim 5 wherein:
    the database key is unique for a particular computing system.

7. The method of claim 1 further comprising:
    producing a wrapper XMLDocument class in the digital document; and
    producing a wrapper XMLElement class in the digital document.

8. The method of claim 2 further comprising:
    maintaining the relationship between the parent element and the child element after the child element is loaded into memory.

9. The method of claim 2 further comprising:
    retrieving the child component from an external database.

10. The method of claim 9 wherein:
the database includes a relational database.

11. The method of claim 2 wherein:
the database key is unique for a particular computing system.

12. The method of claim 2 wherein:
the digital document includes a wrapper XMLDocument class; and
the digital document includes a wrapper XMLElement class.

13. The method of claim 9 wherein:
the database includes a compressed archive file.

14. The method of claim 2 further comprising:
determining if the child component is seldom accessed.

15. The method of claim 2 further comprising:
determining if the child component is needed in memory; and
if the child component is not needed in memory, performing a garbage collection operation to remove the child component from memory.

16. The method of claim 15 further comprising:
performing the garbage collection operation if the child component is seldom accessed.

17. The method of claim 15 further comprising:
dynamically determining if the child component is needed.

18. A computing system for loading a virtual DOM model of an XML document into memory comprising:
a data processor;
a memory device connected to the processor;
the memory device storing a logic program; and
the data processor operative with the logic program to causing the computing system to load a virtual DOM model of an XML document into the memory device by performing the following steps:
receiving a virtual DOM compatible digital document having at least one child element including a child component attribute that is associated with an external portion of the XML document located on a storage device;
loading the virtual DOM compatible digital document into the memory;
receiving a request for the child component;
then loading the child component into the memory using the child component attribute to obtain the child component from the storage device, wherein,
the digital document includes at least one wrapper class, and
the child component attribute includes an external link tag that includes a database key.

19. The system of claim 18 further comprising:
the data processor operative with the logic program to causing the computing system to load a virtual DOM model of an XML document into the memory by performing the following steps:
determining if the child component is needed in the memory; and
if the child component is not needed in the memory, performing a garbage collection operation to remove the child component from the memory.

* * * * *